(12) United States Patent
He et al.

(10) Patent No.: US 9,838,116 B2
(45) Date of Patent: Dec. 5, 2017

(54) DETECTING PRESENCE OF ACTIVE OPTICAL CABLES IN PERIPHERAL COMPONENT INTERCONNECT-EXPRESS LINKS

(71) Applicant: Finisar Corporation, Sunnyvale, CA (US)

(72) Inventors: Hongdang He, Shanghai (CN); Qin Chen, Shanghai (CN)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 14/991,348

(22) Filed: Jan. 8, 2016

(65) Prior Publication Data

US 2017/0026115 A1 Jan. 26, 2017

(30) Foreign Application Priority Data

Jul. 21, 2015 (CN) .......................... 2015 1 0431945

(51) Int. Cl.
*H04B 10/079* (2013.01)
*H04B 10/80* (2013.01)
*G06F 13/42* (2006.01)
*G06F 13/40* (2006.01)

(52) U.S. Cl.
CPC ... *H04B 10/07955* (2013.01); *G06F 13/4086* (2013.01); *G06F 13/4282* (2013.01); *H04B 10/801* (2013.01); *G06F 2213/0026* (2013.01)

(58) Field of Classification Search
CPC ............ H04B 10/07955; H04B 10/503; H04B 10/564; H04B 10/801
See application file for complete search history.

(56) References Cited

U.S. PATENT DOCUMENTS

| 2011/0150487 | A1* | 6/2011 | Walter | H04B 10/2504 398/115 |
| 2014/0023312 | A1* | 1/2014 | Shang | H04B 10/40 385/12 |
| 2014/0112626 | A1* | 4/2014 | Galloway | G02B 6/4279 385/88 |
| 2016/0080843 | A1* | 3/2016 | Charbonneau-Lefort | H04Q 11/0071 398/45 |
| 2016/0191171 | A1* | 6/2016 | Walker | H04B 10/5161 398/183 |
| 2016/0274921 | A1* | 9/2016 | Walker | H04B 3/28 |

* cited by examiner

*Primary Examiner* — Dzung Tran
(74) *Attorney, Agent, or Firm* — Maschoff Brennan (57) ABSTRACT

A peripheral component interconnect-express (PCIe) link with presence of an active optical cable (AOC) that couples between an electrical PCIe (E-PCIe) transmitter and an E-PCIe receiver may include the AOC. The AOC may include an electrical-to-optical PCIe (EO-PCIe) transceiver coupled to the E-PCIe transmitter. The EO-PCIe transceiver may include a laser diode driver that includes a common mode voltage output terminal. The EO-PCIe transceiver may include a detection condition circuit that includes a decoupling capacitor. The decoupling capacitor may be referenced to a ground level and may connect to the common mode voltage output terminal of the laser diode driver. The detection condition circuit may create a receiver detection condition for a receiver detection circuit of the E-PCIe transmitter to detect presence of the AOC.

20 Claims, 5 Drawing Sheets

DETECTING PRESENCE OF ACTIVE OPTICAL CABLES IN PERIPHERAL COMPONENT INTERCONNECT-EXPRESS LINKS

FIELD

Some embodiments described herein generally relate to detecting presence of an active optical cable (AOC) in a peripheral component interconnect-express (PCIe) link, and more generally to detecting presence of an apparatus with a specific input terminating impedance.

BACKGROUND

Unless otherwise indicated herein, the materials described herein are not prior art to the claims in the present application and are not admitted to be prior art by inclusion in this section.

A PCIe receiver in a PCIe link may include input stage terminals with resistors (e.g., 50-ohm resistors) referenced to a ground level. The input stage terminals with the resistors may be used for detecting presence of the PCIe receiver. When an AOC is applied in the PCIe link, an electrical-to-optical PCIe (OE-PCIe) transceiver of the AOC may not include an input stage terminal with a resistor referenced to the ground level for detection of the OE-PCIe transceiver.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to detecting presence of an AOC in a PCIe link and/or to detecting presence of an apparatus with a specific input terminating impedance.

In an example embodiment, a PCIe link may include an AOC that includes an electrical-to-optical PCIe (EO-PCIe) transceiver coupled to an electrical PCIe (E-PCIe) transmitter. The EO-PCIe transceiver may include a laser diode driver that includes a common mode voltage output terminal. The laser diode driver may include waveshapping, clock and data recovery (CDR), or other link circuits. The EO-PCIe transceiver may include a detection condition circuit that includes a decoupling capacitor. The decoupling capacitor may be referenced to a ground level and may connect to the common mode voltage output terminal of the laser diode driver. The detection condition circuit may create a receiver detection condition for a receiver detection circuit of the E-PCIe transmitter to detect presence of the AOC.

In another example embodiment, a PCIe link may include a first alternating current (AC) coupling capacitor that couples to a first output terminal of an E-PCIe transmitter. The PCIe link may include a second AC coupling capacitor that couples to a second output terminal of the E-PCIe transmitter. The PCIe link may include an AOC that includes an electrical-to-optical PCIe (EO-PCIe) transceiver that includes a laser diode driver. The laser diode driver may include a first input terminal that couples to the first output terminal of the E-PCIe transmitter via the first AC coupling capacitor. The laser diode driver may include a second input terminal that couples to the second output terminal of the E-PCIe transmitter via the second AC coupling capacitor. The EO-PCIe transceiver may include a detection condition circuit. The detection condition circuit may include a first direct current (DC) blocking capacitor that couples between the first AC coupling capacitor and the first input terminal of the laser diode driver. The detection condition circuit may also include a first inductive impedance that may be referenced to a ground level and may connect to a point in a first signal route between the first AC coupling capacitor and the first DC blocking capacitor. The detection condition circuit may also include a second DC blocking capacitor that couples between the second AC coupling capacitor and the second input terminal of the laser diode driver. The detection condition circuit may also include a second inductive impedance that may be referenced to the ground level and may connect to a point in a second signal route between the second AC coupling capacitor and the second DC blocking capacitor. A first combination of the first inductive impedance and the first DC blocking capacitor and a second combination of the second inductive impedance and the second DC blocking capacitor may each create a receiver detection condition for a receiver detection circuit of the E-PCIe transmitter to detect presence of the AOC.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments described herein generally relate to detecting presence of an AOC applied in a PCIe link.

In some embodiments, an EO-PCIe transceiver of an AOC in a PCIe link may include a common mode voltage output terminal. A detection condition circuit, which may include a decoupling capacitor, may be referenced to a ground level and may connect to the common mode voltage output terminal of the EO-PCIe transceiver. The detection condition circuit may create a receiver detection condition for detecting presence of the AOC and/or the EO-PCIe transceiver of the AOC. The receiver detection condition may include a formation of an equivalent terminal referenced to the ground level with a single-end direct current (DC) impedance. For example, a laser diode driver of the EO-PCIe transceiver may include a differential input impedance of about 100 ohms, and the decoupling capacitor may enable a formation of an equivalent terminal referenced to the ground level with a single-end DC impedance of about 50 ohms.

Alternatively, the EO-PCIe transceiver of the AOC in the PCIe link may not include a common mode voltage output terminal. A detection condition circuit, which may include DC blocking capacitors and inductive impedances, may create a receiver detection condition for detecting presence of the AOC and/or the EO-PCIe transceiver of the AOC. The receiver detection condition may include a formation of an equivalent terminal referenced to the ground level with a single-end DC impedance. In some embodiments, each inductive impedance may include a series connection of an inductor and a resistor. Alternatively, each inductive impedance may include a first resistor, a second resistor, and an inductor, where the first resistor and the inductor may be coupled using a parallel connection, and the second resistor may be coupled to the parallel connection of the first resistor and the inductor using a series connection.

In some embodiments, the AOC may be configured for a form factor including, but not limited to, small form-factor pluggable (SFP), quad small form-factor pluggable (QSFP), 12× small form-factor pluggable (CXP), and/or another suitable form factor.

Reference will now be made to the drawings to describe various aspects of some example embodiments of the invention. The drawings are diagrammatic and schematic representations of such example embodiments, and are not limiting of the present invention, nor are they necessarily drawn to scale.

Figure 1:
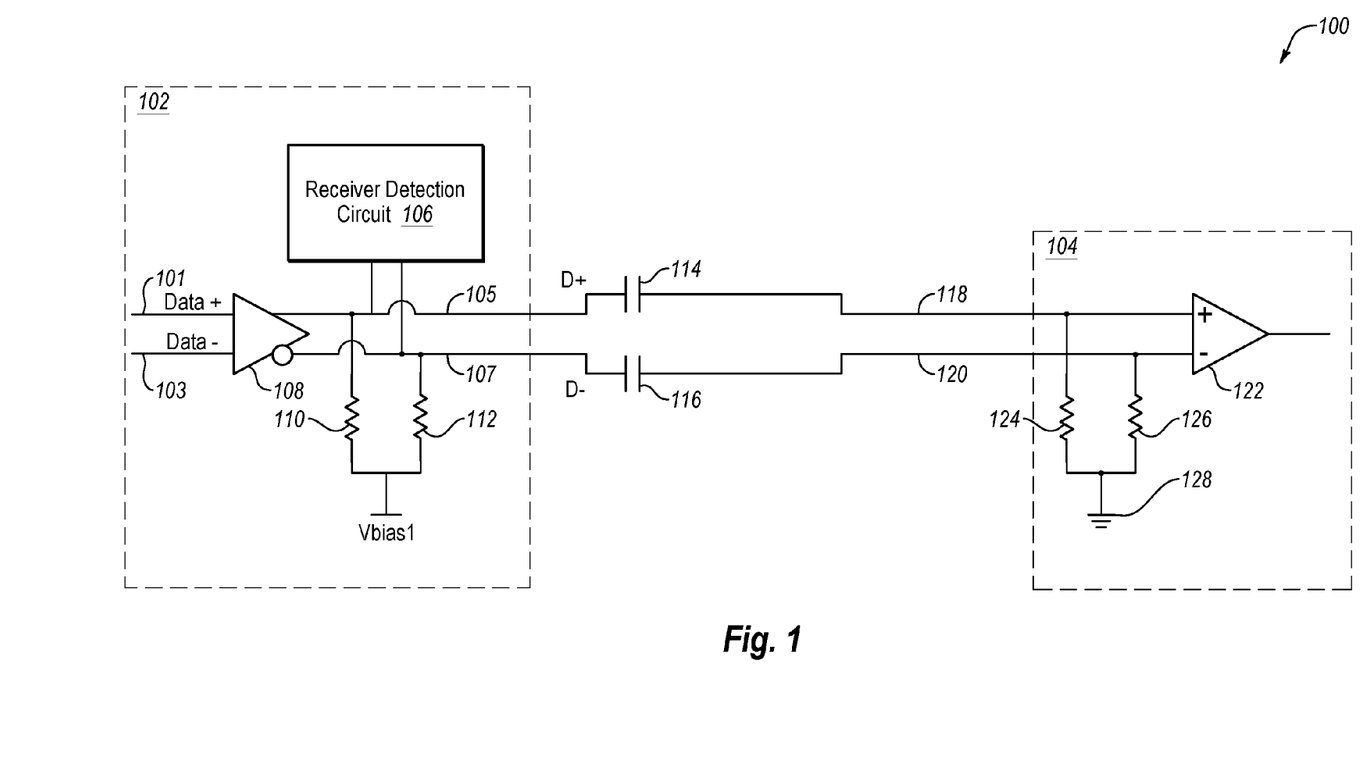
FIG. 1 is a schematic diagram that illustrates an example PCIe link.

FIG. 1 is a schematic diagram that illustrates an example PCIe link 100, arranged in accordance with at least some embodiments described herein. The PCIe link 100 may include an electrical PCIe (E-PCIe) transmitter 102, an E-PCIe receiver 104, alternating current (AC) capacitors 114 and 116, PCIe link media 118 and 120, and other suitable components. In some embodiments, each of the E-PCIe receiver 102 and the E-PCIe transmitter 104 may include an E-PCIe transceiver.

The E-PCIe transmitter 102 may include a receiver detection circuit 106, an amplifier 108, resistors 110 and 112, input terminals 101 and 103, output terminals 105 and 107, and/or other suitable components. Signals may be inputted to the amplifier 108 through the input terminals 101 and 103. The amplifier 108 may output signals to the AC coupling capacitors 114 and 116 through the output terminals 105 and 107.

The E-PCIe receiver 104 may include single-end direct current (DC) impedances 124 and 126 referenced to a ground level, an amplifier 122, and other suitable components. In some embodiments, the DC impedances 124 and 126 may include resistors each with a value of 50 ohms or another suitable value. The E-PCIe receiver 104 may establish a receiver presence detection condition for the receiver detection circuit 106 by including the DC impedances 124 and 126 referenced to the ground level, so that the receiver detection circuit 106 may detect presence of the E-PCIe receiver 104.

For example, the receiver detection circuit 106 may detect presence of the E-PCIe receiver 104 by measuring at the output terminal 105 a voltage changing rate of a resistor-capacitor (RC) circuit, where the RC circuit may be formed by the AC coupling capacitor 114 and the DC impedance 124. The voltage changing rate at the output terminal 105 may be illustrated by:

$$\frac{dV_{105}}{dt} = -\frac{V_0}{R_{124}C_{114}} e^{-\frac{t}{R_{124}C_{114}}}, \qquad (1)$$

where $V_{105}$ may represent a voltage at the output terminal 105, $V_0$ may represent a pulse voltage amplitude of the receiver detection circuit 106, $R_{124}$ may represent a resistance value of the DC impedance 124, and $C_{114}$ may represent a capacitance value of the AC coupling capacitor 114.

Alternatively or additionally, the receiver detection circuit 106 may detect presence of the E-PCIe receiver 104 by measuring at the output terminal 107 a voltage changing rate of a RC circuit, where the RC circuit may be formed by the AC coupling capacitor 116 and the DC impedance 126. The voltage changing rate at the output terminal 107 may be illustrated by:

$$\frac{dV_{107}}{dt} = -\frac{V_0}{R_{126}C_{116}} e^{-\frac{t}{R_{126}C_{116}}}, \qquad (2)$$

where $V_{107}$ may represent a voltage at the output terminal 107, $R_{126}$ may represent a resistance value of the DC impedance 126, and $C_{116}$ may represent a capacitance value of the AC coupling capacitor 116.

Figure 2:
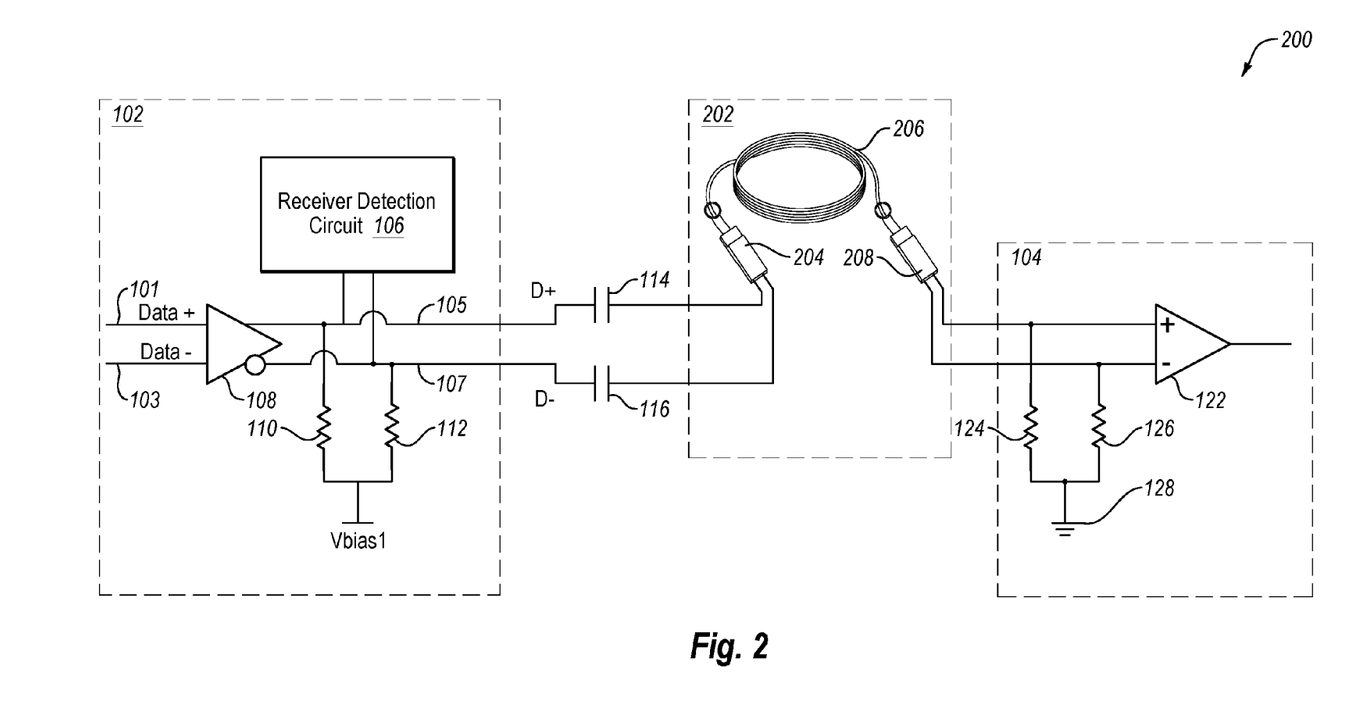
FIG. 2 is a schematic diagram that illustrates an example configuration of an AOC applied in a PCIe link.

FIG. 2 is a schematic diagram that illustrates an example AOC 202 applied in a PCIe link 200, arranged in accordance with at least some embodiments described herein. The PCIe link 200 may include components similar or identical to those of the PCIe link 100 of FIG. 1. Description for the similar or identical components will not be repeated here.

The AOC 202 may be coupled to the E-PCIe transmitter 102 via the AC coupling capacitors 114 and 116. The AOC 202 may also be coupled to the E-PCIe receiver 104. The AOC 202 may include an electrical-to-optical PCIe (EO-PCIe) transceiver 204, an optical-to-electrical (OE-PCIe) transceiver 208, and an optical cable 206. The optical cable 206 may couple between the EO-PCIe transceiver 204 and the OE-PCIe transceiver 208. In some embodiments, the optical cable 206 may include a single optical fiber or a ribbon optical fiber cable. The EO-PCIe transceiver 204 may be coupled to the E-PCIe transmitter 102 through the AC coupling capacitors 114 and 116 and may be considered a PCIe receiver with respect to the E-PCIe transmitter 102. The OE-PCIe transceiver 208 may be coupled to the E-PCIe receiver 104 and may be considered a PCIe transmitter with respect to the E-PCIe receiver 104.

Figure 3:
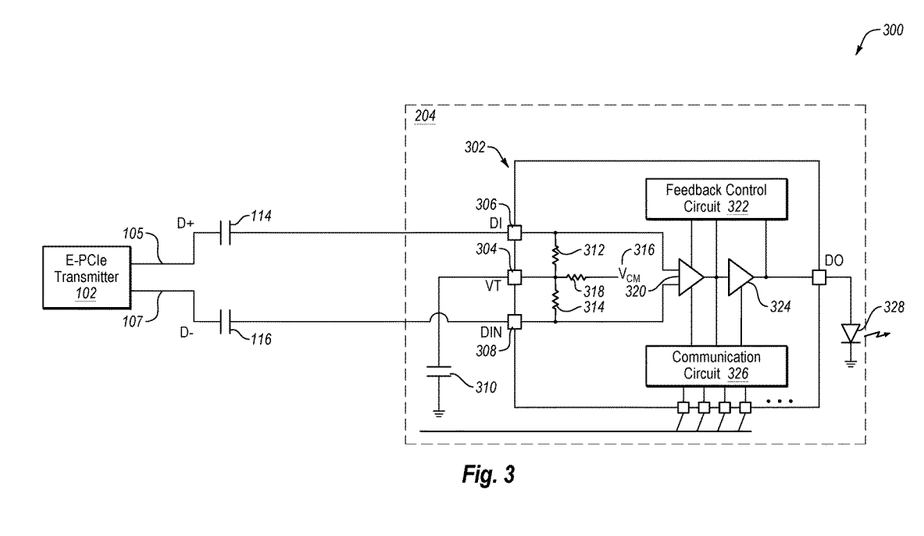
FIG. 3 is a schematic diagram that illustrates an example implementation of an electrical-to-optical PCIe (EO-PCIe) transceiver in the AOC of FIG. 2.

FIG. 3 is a schematic diagram that illustrates an example implementation 300 of the EO-PCIe transceiver 204 of FIG. 2, arranged in accordance with at least some embodiments described herein. The EO-PCIe transceiver 204 may include a laser diode driver 302, a laser diode 328, a detection condition circuit that includes a decoupling capacitor 310, and/or other suitable components.

The laser diode driver 302 may include input terminals 306 and 308; a common mode voltage output terminal 304; resistors 312, 314, and 318; a common mode voltage 316; amplifiers 320 and 324; a feedback control circuit 322; a communication circuit 326; and/or other suitable components. The input terminal 306 of the laser diode driver 302 may be coupled to the output terminal 105 of the E-PCIe transmitter 102 through the AC coupling capacitor 114. The input terminal 308 of the laser diode driver 302 may be coupled to the output terminal 107 of the E-PCIe transmitter 102 through the AC coupling capacitor 116. The resistors 312 and 314 may each have a resistance value of 50 ohms or another suitable value. The laser diode driver 302 may include a differential input impedance of about 100 ohms or another suitable value.

The decoupling capacitor 310 may be connected to the common mode voltage output terminal 304 and referenced to a ground level. Even though the EO-PCIe transceiver 204 does not actually include a single-end DC impedance of 50 ohms referenced to the ground level, the EO-PCIe transceiver 204 includes the decoupling capacitor 310 connected to the common mode voltage output terminal 304. Thus, a receiver detection condition may be created for the receiver detection circuit 106 of the E-PCIe transmitter 102 to detect presence of the EO-PCIe transceiver 204.

For example, with reference to FIG. 3, a voltage changing rate at the output terminal 105 may be illustrated by:

$$\frac{dV_{105}}{dt} = -\frac{V_0}{R_{312}\hat{C}} e^{-\frac{t}{R_{312}\hat{C}}}, \quad (3)$$

$$\hat{C} = \frac{C_{114}}{1 + \frac{C_{114}}{0.5C_{310}}}, \quad (4)$$

where $R_{312}$ may represent a resistance value of the resistor 312, and $C_{310}$ may represent a capacitance value of the decoupling capacitor 310. If $0.5C_{310} \gg C_{114}$ and $R_{312}=R_{124}$, then $\hat{C} \approx C_{114}$ and equation (3) may be similar or identical to equation (1). Thus, an equivalent RC circuit similar to that formed by the DC impedance 124 and the AC coupling capacitor 114 of FIG. 1 may be formed in the example of FIG. 3. The receiver detection circuit 106 of the E-PCIe transmitter 102 may detect presence of the EO-PCIe transceiver 204 by measuring the voltage changing rate at the output terminal 105.

Alternatively or additionally, a voltage changing rate at the output terminal 107 may be illustrated by:

$$\frac{dV_{107}}{dt} = -\frac{V_0}{R_{314}\hat{C}} e^{-\frac{t}{R_{314}\hat{C}}}, \quad (5)$$

$$\hat{C} = \frac{C_{116}}{1 + \frac{C_{116}}{0.5C_{310}}}, \quad (6)$$

where $R_{314}$ may represent a resistance value of the resistor 314. If $0.5C_{310} \gg C_{116}$ and $R_{314}=R_{126}$, then $\hat{C} \approx C_{116}$ and equation (5) may be similar or identical to equation (2). Thus, an equivalent RC circuit similar to that formed by the DC impedance 126 and the AC coupling capacitor 116 of FIG. 1 may be formed in the example of FIG. 3. The receiver detection circuit 106 of the E-PCIe transmitter 102 may detect presence of the EO-PCIe transceiver 204 by measuring the voltage changing rate at the output terminal 107.

Figure 4:
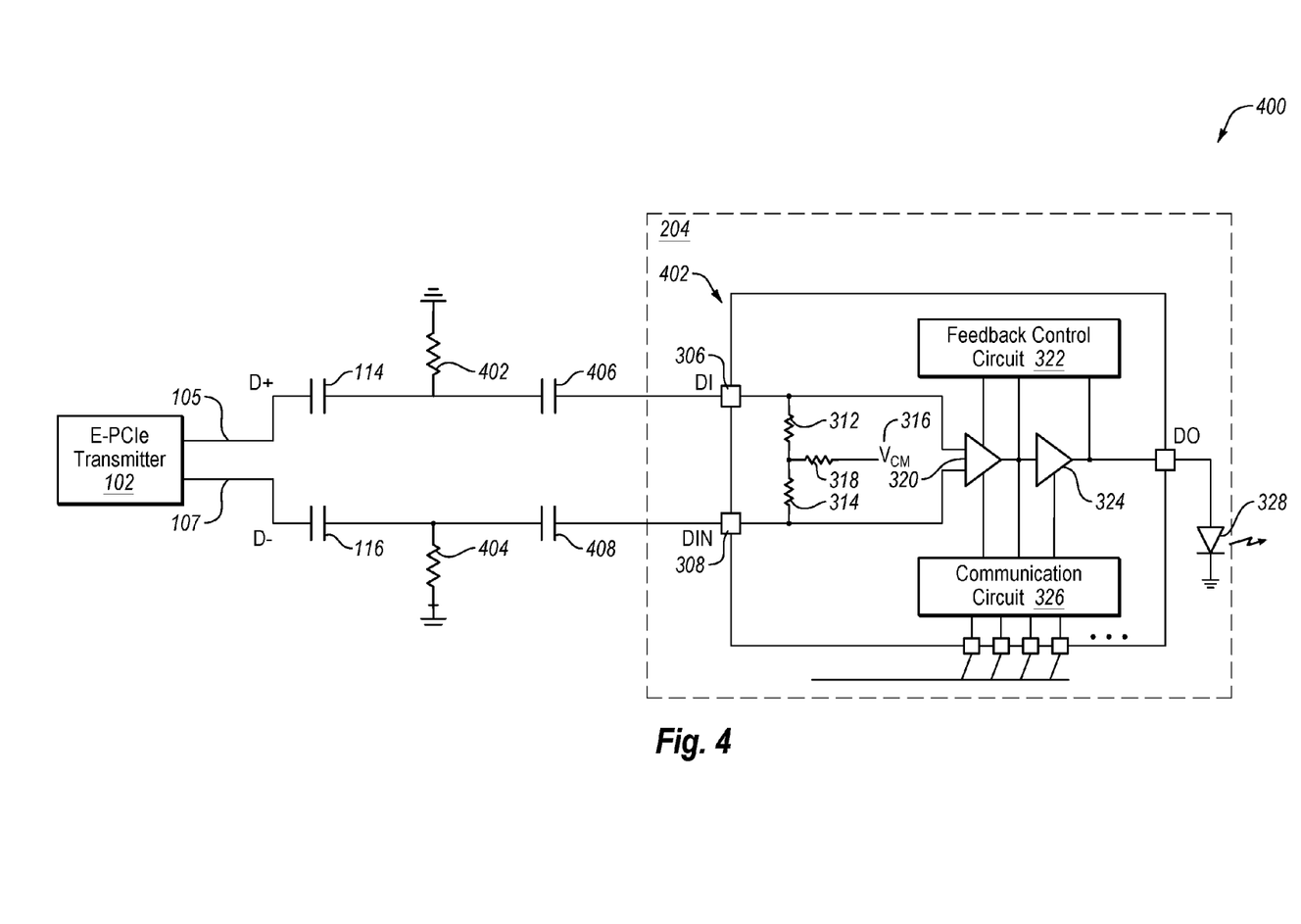
FIG. 4 is a schematic diagram that illustrates another example implementation of the EO-PCIe transceiver in the AOC of FIG. 2.

FIG. 4 is a schematic diagram that illustrates another example implementation 400 of the EO-PCIe transceiver 204 of FIG. 2, arranged in accordance with at least some embodiments described herein. The EO-PCIe transceiver 204 may include a laser diode driver 402, the laser diode 328, and/or other suitable components.

The laser diode driver 402 may include the input terminals 306 and 308; the resistors 312, 314, and 318; the common mode voltage 316; the amplifiers 320 and 324; the feedback control circuit 322; the communication circuit 326; and/or other suitable components. The laser diode driver 402 may include components identical or similar to those of the laser diode driver 302 of FIG. 3, and similar description will not be repeated here. Unlike the laser diode driver 302 of FIG. 3, the laser diode driver 402 does not include a common mode voltage output terminal.

A detection condition circuit may be inserted in the PCIe link to facilitate the receiver detection circuit 106 of the E-PCIe transmitter 102 to detect presence of the EO-PCIe transceiver 204. The detection condition circuit may include DC blocking capacitors 406 and 408 and inductive impedances 402 and 404. The DC blocking capacitor 406 may couple between the AC coupling capacitor 114 and the input terminal 306 of the laser diode driver 402. The inductive impedance 402 may be referenced to the ground level and may connect to a point in a first signal route between the AC coupling capacitor 114 and the DC blocking capacitor 406. The DC blocking capacitor 408 may couple between the AC coupling capacitor 116 and the input terminal 308 of the laser diode driver 402. The inductive impedance 404 may be referenced to the ground level and may connect to a point in a second signal route between the AC coupling capacitor 116 and the DC blocking capacitor 408.

The inductive impedances 402 and 404 may include an impedance value of about 0.50 ohms at low frequencies (e.g., at a frequency close to DC) and may include a higher impedance value at high frequencies. Example implementations of the inductive impedances 402 and 404 are provided with reference to FIGS. 5A and 5B.

Figure 5A:
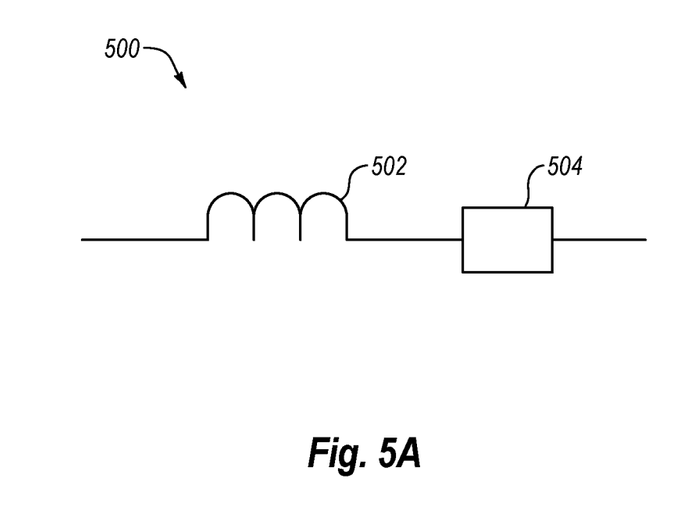
FIGS. 5A and 5B are schematic diagrams that illustrate various example inductive impedances implemented in a detection condition circuit.
Figure 5B:
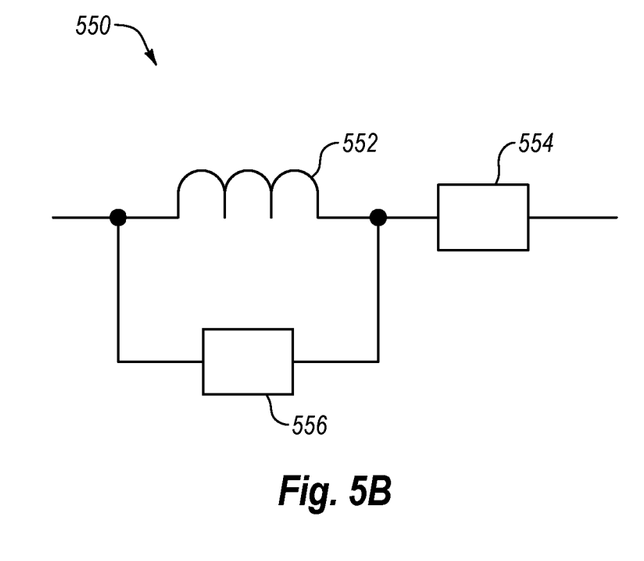

Turning to FIG. 5A, an example inductive impedance 500 is illustrated. The inductive impedances 402 and 404 of FIG. 4 may each include a structure similar or identical to the inductive impedance 500 of FIG. 5A. The inductive impedance 500 may include an inductor 502 and a resistor 504 coupled in a series connection. The resistor 504 may have a value of 50 ohms or another suitable value. Turning to FIG. 5B, another example inductive impedance 550 is illustrated. The inductive impedances 402 and 404 of FIG. 4 may each include a structure similar or identical to the inductive impedance 550 of FIG. 5B. The inductive impedance 550 may include an inductor 552, a resistor 554, and a resistor 556. The inductor 552 and the resistor 556 may be coupled in a parallel connection. The parallel connection of the inductor 552 and the resistor 556 may then be connected to the resistor 554 in a series connection. The resistor 554 may have a value of about 50 ohms or another suitable value. The resistor 556 may have a value of about 500 ohms or another suitable value. The inductor 502/552 may have an inductance value of about 82 nanoHenry (nH) or another suitable value.

With combined reference to FIGS. 4 and 5A, the receiver detection circuit 106 of the E-PCIe transmitter 102 may charge a voltage from $V_1$ to $V_2$. A voltage at the output terminal 105 may be illustrated by:

$$V_{105} = V_2 - \frac{(V_2 - V_1)R}{4\omega_0 L_{502}\sqrt{\xi^2 - 1}}\left(e^{-\omega_0(\xi+\sqrt{\xi^2-1})t} - e^{-\omega_0(\xi-\sqrt{\xi^2-1})t}\right), \quad (7)$$

where $$\omega_0 = \frac{1}{\sqrt{L_{502}C_{114}}}, \xi = \frac{R}{2}\sqrt{\frac{C_{114}}{L_{502}}} \geq 870, V = V_2 - V_1,$$

R may represent a sum of a resistance value of the resistor 504 and an internal impedance of the receiver detection circuit 106 of the E-PCIe transmitter 102, and $L_{502}$ may represent an inductance value of the inductor 502. If $R_{504} \ll R_{312} + 0.5R_{318}$, where $R_{504}$ may represent a resistance value of the resistor 504 and $R_{318}$ may represent a resistance value of the resistor 318, then $R \approx R_{504}$. Combining equations (1) and (7), and assuming the components have the specific values mentioned $V_{105}$ from equation (7) may have a voltage changing rate approximate to that of equation (1) when t>5 nanoseconds (ns), with a voltage difference less than 5%. If t≤5 ns may be ignored while the receiver detection circuit 106 may have voltage transition, a voltage changing rate at the output terminal 105 may be detected with tolerance to determine presence of the EO-PCIe transceiver 204 and/or presence of the AOC 202 in the PCIe link. Similarly, a voltage changing rate may be determined for the output terminal 107 to detect presence of the EO-PCIe transceiver 204 and/or presence of the AOC 202 in the PCIe link.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A peripheral component interconnect-express (PCIe) link with presence of an active optical cable (AOC) that couples between an electrical PCIe (E-PCIe) transmitter and an E-PCIe receiver, the PCIe link comprising:
   the AOC that includes an electrical-to-optical PCIe (EO-PCIe) transceiver coupled to the E-PCIe transmitter, wherein the EO-PCIe transceiver includes a laser diode driver that includes a common mode voltage output terminal; and
   a detection condition circuit that includes a decoupling capacitor, the detection condition circuit included in the EO-PCIe transceiver, wherein the decoupling capacitor is referenced to a ground level and connects to the common mode voltage output terminal of the laser diode driver,
   wherein the detection condition circuit creates a receiver detection condition for a receiver detection circuit of the E-PCIe transmitter to detect presence of the AOC.

2. The PCIe link of claim 1, wherein the AOC further comprises:
   an optical-to-electrical PCIe (OE-PCIe) transceiver coupled to the E-PCIe receiver; and
   an optical fiber coupled between the EO-PCIe transceiver and the OE-PCIe transceiver.

3. The PCIe link of claim 2, further comprising:
   the E-PCIe transmitter that includes the receiver detection circuit, a first output terminal, and a second output terminal;
   a first AC coupling capacitor that couples between the first output terminal of the E-PCIe transmitter and a first input terminal of the laser diode driver;
   a second AC coupling capacitor that couples between the second output terminal of the E-PCIe transmitter and a second input terminal of the laser diode driver; and
   the E-PCIe receiver that couples to the OE-PCIe transceiver.

4. The PCIe link of claim 3, wherein the receiver detection circuit is configured to detect presence of the AOC by measuring a voltage changing rate at the first output terminal of the E-PCIe transmitter.

5. The PCIe link of claim 3, wherein the receiver detection circuit is configured to detect presence of the AOC by measuring a voltage changing rate at the second output terminal of the E-PCIe transmitter.

6. The PCIe link of claim 1, wherein the receiver detection condition includes a formation of an equivalent terminal referenced to the ground level with a single-end direct current (DC) impedance.

7. The PCIe link of claim 1, wherein the laser diode driver includes a differential input impedance of about 100 ohms, and the decoupling capacitor enables a formation of an equivalent terminal referenced to the ground level with a single-end direct current (DC) impedance of about 50 ohms.

8. A peripheral component interconnect-express (PCIe) link with presence of an active optical cable (AOC) that couples between an electrical PCIe (E-PCIe) transmitter and an E-PCIe receiver, the PCIe link comprising:
   the E-PCIe transmitter that includes a receiver detection circuit, a first output terminal, and a second output terminal;

a first alternating current (AC) coupling capacitor that couples to the first output terminal of the E-PCIe transmitter;

a second AC coupling capacitor that couples to the second output terminal of the E-PCIe transmitter;

the E-PCIe receiver;

the AOC that includes:

an electrical-to-optical PCIe (EO-PCIe) transceiver coupled to the E-PCIe transmitter, wherein the EO-PCIe transceiver includes a laser diode driver that includes:

a common mode voltage output terminal;

a first input terminal that couples to the first AC coupling capacitor; and a second input terminal that couples to the second AC coupling capacitor;

an optical-to-electrical PCIe (OE-PCIe) transmitter coupled to the E-PCIe receiver; and an optical fiber coupled between the EO-PCIe transceiver and the OE-PCIe transceiver; and a decoupling capacitor that is referenced to a ground level and connects to the common mode voltage output terminal of the laser diode driver, wherein the decoupling capacitor is included in the EO-PCIe transceiver and the decoupling capacitor creates a receiver detection condition for the receiver detection circuit of the E-PCIe transmitter to detect presence of the AOC.

9. The PCIe link of claim 8, wherein the receiver detection circuit is configured to detect presence of the AOC by measuring a voltage changing rate at the first output terminal of the E-PCIe transmitter.

10. The PCIe link of claim 8, wherein the receiver detection circuit is configured to detect presence of the AOC by measuring a voltage changing rate at the second output terminal of the E-PCIe transmitter.

11. The PCIe link of claim 8, wherein the receiver detection condition includes a formation of an equivalent terminal referenced to the ground level with a single-end direct current (DC) impedance.

12. A peripheral component interconnect-express (PCIe) link with presence of an active optical cable (AOC) that couples between an electrical PCIe (E-PCIe) transmitter and an E-PCIe receiver, the PCIe link comprising:

a first alternating current (AC) coupling capacitor that couples to a first output terminal of the E-PCIe transmitter;

a second AC coupling capacitor that couples to a second output terminal of the E-PCIe transmitter;

the AOC that includes an electrical-to-optical PCIe (EO-PCIe) transceiver that includes a laser diode driver, wherein the laser diode driver includes:

a first input terminal that couples to the first output terminal of the E-PCIe transmitter via the first AC coupling capacitor; and a second input terminal that couples to the second output terminal of the E-PCIe transmitter via the second AC coupling capacitor; and a detection condition circuit that includes:

a first direct current (DC) blocking capacitor that couples between the first AC coupling capacitor and the first input terminal of the laser diode driver;

a first inductive impedance that is referenced to a ground level and connects to a point in a first signal route between the first AC coupling capacitor and the first DC blocking capacitor;

a second DC blocking capacitor that couples between the second AC coupling capacitor and the second input terminal of the laser diode driver; and a second inductive impedance that is referenced to the ground level and connects to a point in a second signal route between the second AC coupling capacitor and the second DC blocking capacitor, wherein a first combination of the first inductive impedance and the first DC blocking capacitor and a second combination of the second inductive impedance and the second DC blocking capacitor each create a receiver detection condition for a receiver detection circuit of the E-PCIe transmitter to detect presence of the AOC.

13. The PCI-e link of claim 12, further comprising:

the E-PCIe transmitter that includes the receiver detection circuit, the first output terminal, and the second output terminal.

14. The PCIe link of claim 12, wherein the receiver detection circuit is configured to detect presence of the AOC by measuring a voltage changing rate at the first output terminal of the E-PCIe transmitter.

15. The PCIe link of claim 12, wherein the receiver detection circuit is configured to detect presence of the AOC by measuring a voltage changing rate at the second output terminal of the E-PCIe transmitter.

16. The PCIe link of claim 12, wherein the receiver detection condition includes a formation of an equivalent terminal referenced to the ground level with a single-end DC impedance.

17. The PCIe link of claim 12, wherein the first combination of the first inductive impedance and the first DC blocking capacitor forms an equivalent terminal referenced to the ground level with a single-end DC impedance.

18. The PCIe link of claim 12, wherein the second combination of the second inductive impedance and the second DC blocking capacitor forms an equivalent terminal referenced to the ground level with a single-end DC impedance.

19. The PCIe link of claim 12, wherein the first inductive impedance includes a series connection of a first inductor and a first resistor, and the second inductive impedance includes a series connection of a second inductor and a second resistor.

20. The PCIe link of claim 12, wherein:

each of the first inductive impedance and the second inductive impedance includes a first resistor, a second resistor, and an inductor;

the first resistor and the inductor are coupled in a parallel connection; and the second resistor is coupled to the parallel connection of the first resistor and the inductor with a series connection.

* * * * *